United States Patent [19]

Hobson, Jr.

[11] Patent Number: 4,872,981

[45] Date of Patent: Oct. 10, 1989

[54] SPLIT INLET FOR FILTER

[76] Inventor: Russell Hobson, Jr., Rte. 1, Box 30, Old Fort, N.C. 28762

[21] Appl. No.: 141,651

[22] Filed: Jan. 7, 1988

[51] Int. Cl.$^4$ ............................................ B01D 29/24
[52] U.S. Cl. .................................. 210/323.2; 210/346; 210/420; 210/424; 210/486; 55/201; 55/418
[58] Field of Search ...................... 210/223.2, 340, 346, 210/357, 359, 486, 323.1, 420, 424; 55/307, 308, 199, 201, 418, 420

[56] References Cited

U.S. PATENT DOCUMENTS

| | | |
|---|---|---|
| 3,319,793 | 5/1967 | Miller, Jr. et al. ............... 210/323.2 |
| 3,859,214 | 1/1975 | Lang et al. ....................... 210/323.2 |
| 4,163,724 | 8/1979 | Muller et al. .................... 210/323.2 |
| 4,402,828 | 9/1983 | Edens ............................... 210/323.2 |
| 4,517,086 | 5/1985 | Romey et al. ................... 210/323.2 |
| 4,525,274 | 6/1985 | Willus et al. .................... 210/323.2 |
| 4,526,689 | 7/1985 | Morgan ........................... 210/323.2 |
| 4,552,661 | 11/1985 | Morgan ........................... 210/323.2 |
| 4,610,786 | 9/1986 | Pearson ........................... 210/323.2 |

Primary Examiner—Richard V. Fisher
Assistant Examiner—Wanda L. Millard
Attorney, Agent, or Firm—Weingram & Zall

[57] ABSTRACT

A filter unit using a bump-type filter is disclosed. Briefly stated, a chamber has a split fluid inlet conduit so that contaminated fluid, upon entering the chamber, is directed upwardly towards filter tubes and downwardly towards the bottom of the chamber. The fluid flow is diverted during startup so as to be directed only downward thereby enabling precoat of the filter element. Two tube sheets are utilized with incoming fluid in the vertically upward inlet conduit forcing incoming contaminated fluid to be deposited between the two tube sheets thereby. During operation contaminated fluid flows upwardly and downwardly towards the filter tubes so as to prevent disturbance of filter tubes as a result of turbulence in the chamber.

18 Claims, 6 Drawing Sheets

STEP (1) SET VALVES — 102

(2) START PUMP — 104

(3) TIMED PRE-COAT 1-6 MIN. (VARIABLE) — 106

(4) ON-STREAM OPEN — 108 → BY-PASS CLOSED — 110

(5) BUMP — 112

(6) REPEAT STEP 1 — 114

SPLIT INLET FOR FILTER

CROSS-REFERENCE TO RELATED APPLICATION

This application is related to U.S. application Ser. No. 141,650, entitled "Control System for Pump/Cycling" filed concurrently herewith and which remains copending.

BACKGROUND OF THE INVENTION

1. Field of the Invention

This invention relates, generally, to a filter wherein a tank casing is divided by a tube sheet into lower and upper chambers that have respectively an inlet for fluid to be filtered and an outlet for the filtered fluid, and more particularly to a bifurcated inlet for fluids in which turbulence in the bottom of the chamber adjacent the fluid inlet is controlled.

2. Description of the Prior Art

It is known in the art to utilize filters of the pressure type wherein a pressure differential in the liquid being filtered is maintained at opposite sides of a filtering element. Such filters typically use filter elements formed of porous or finely perforated tubes. Uses of such filters are typically for filtering dry cleaning solvents and the like. The operation of such filters is relatively simple. Filtering is usually accomplished by a diatomaceous earth in suspension, with the solvent to be filtered being forced through filter tubes thereby reducing the size of the interstices or perforations in the tube wall and thus enhancing filter operation, such as the removal of lint and dirt from the solvent.

Cleaning of these types of filters is, in concept, quite simple. Generally, the fluid flow is stopped with the result that the diatomaceous earth is allowed to fall to the bottom of the container and settle since it is generally heavier than the solvent. Thereafter, the filtered material may be drained off. Contemporaneously with the cessation of fluid movement is the shaking of the filters known as "bumping". This is generally accomplished by mounting the filter elements on a plate which may be moved while still in the vessel. By moving the plate which holds the filter elements, and striking it abruptly against a barrier or stop, the remaining particles of diatomaceous earth and filtered matter are shaken off the filter elements and hence the use of the word "bumping". Immediately prior to bumping of the filter, backwashing may be accomplished in order to further dislodge matter from the filters. An example of this may be found in U.S. Pat. No. 3,100,190 "Pressure Filter and Filter Tube Therefor" issued Aug. 6, 1963 to R. B. Hobson, Jr. A related disclosure may also be found in U.S. Pat. No. 3,642,141 "Filter Tube and Connection Thereof to Tube Sheet" issued Feb. 15, 1972, to Hobson, Jr. Both of these patents are specifically incorporated by reference herein. These references disclose bump-type filters and are particularly drawn to the filter element therein.

Moreover, these references utilize a fluid inlet wherein the incoming liquid picks the filter medium, such as diatomaceous earth, up off the floor of the container so as to deposit it, or redeposit it, on the filter tube's exterior surfaces in order to perform its filtering function. This is accomplished by use of an elbow on the inlet pipe looking downward toward the the bottom of the container. The fluid stream therefore hits the floor and stirs the accumulated solids into a suspension. In large filters, the flow can be so great that the filter tubes themselves are disturbed by the turbulence (e.g. 2000 gpm in a 60 inch diameter unit). Further, since the bottom ends of the tubes are not anchored in any way, the turbulence can "hammer" the tubes, causing interstitial squirming. The filtering material and/or dirt may also be forced to slide through to the clean side and go downstream into the process thereby defeating the entire purpose of the filter.

Another disadvantage is that there is a tendency for bridging of the diatomaceous earth adjacent the plate where the filter tube is attached thereto. This significantly affects filter performance during operation. Further, the filter must be cleared and hence bumped more frequently and it is more difficult to clean the tubes. Further, in the present system, "Stratification" of the filter media is a problem. This occurs as a result of diatomaceous earth coming from the bottom of the vessel up. Gradually, more earth is deposited at the bottom of the tubes than at the top. This causes a disproportionate deposition of filter media on the tubes with the result that the tubes must be bumped prematurely since the bottom of the tubes will clog up much more quickly than the remaining substantial portion of the tube.

SUMMARY OF THE INVENTION

It is an object of the present invention to produce a filter which does not have to be individually engineered for each and every application site. It is a further object of the present invention to produce a filter which is relatively inexpensive to manufacture and install. A still further object of the present invention is to produce a filter which is simple to operate and does not require "skilled" labor to maintain.

A further object of the present invention is to produce a filter wherein the fluid inlet is controllable so that turbulence does not damage or otherwise negatively affect the performance of the filter tubes. A still further object of the present invention is to produce a fluid inlet which eliminates interstitial squirming and eliminates the migration of dirt and material to the cleaned fluid side of the filter.

Another object of the present invention is to produce a device which eliminates bridging of the filter media. Yet another object of the present invention is to produce a device which minimizes or eliminates stratification of the filter media on the tubes. Still another object is to produce a device which lengthens the time between cleaning and bumping of the filter tubes. Still another object is to provide a device which has the ability to equalize the pressure on the filter tubes along their length by directing unfiltered fluid toward them from two divergent directions.

It is yet another object of the present invention to produce a filter of the type described which may be retrofitted to substantially all similar units presently existing in the field.

A still further object of the present invention is to provide a fluid filter comprising a casing, a first tube sheet which divides the casing into a filtered and an unfiltered chamber and has openings therethrough, a second tube sheet which is disposed in the unfiltered chamber having openings therethrough which are coextensive with the openings in the first tube sheet and which is attached to the first tube sheet, a filter unit in each of the openings in the first tube sheet that extends through the openings in the second tube sheet being comprised of at least one non-porous upper filter tube connected to an opening in the upper tube sheet and extending through a corresponding opening in the lower tube sheet and one lower filter tube connected to the portion of the upper filter tube which extends through the lower tube sheet, a filtered fluid outlet in the filtered chamber, fluid inlet means being comprised of a split outlet coupling which has a fluid inlet and a first fluid outlet for directing the fluid between the first and second tube sheets and a second fluid outlet for directing the fluid away from the filtered chamber, and a valve disposed in the split outlet to direct the flow of fluid through the split outlet coupling.

DESCRIPTION OF THE DRAWINGS

Reference may be now had to the accompanying drawings in which.

DETAILED DESCRIPTION OF THE PREFERRED EMBODIMENT

Construction

Figure 1:
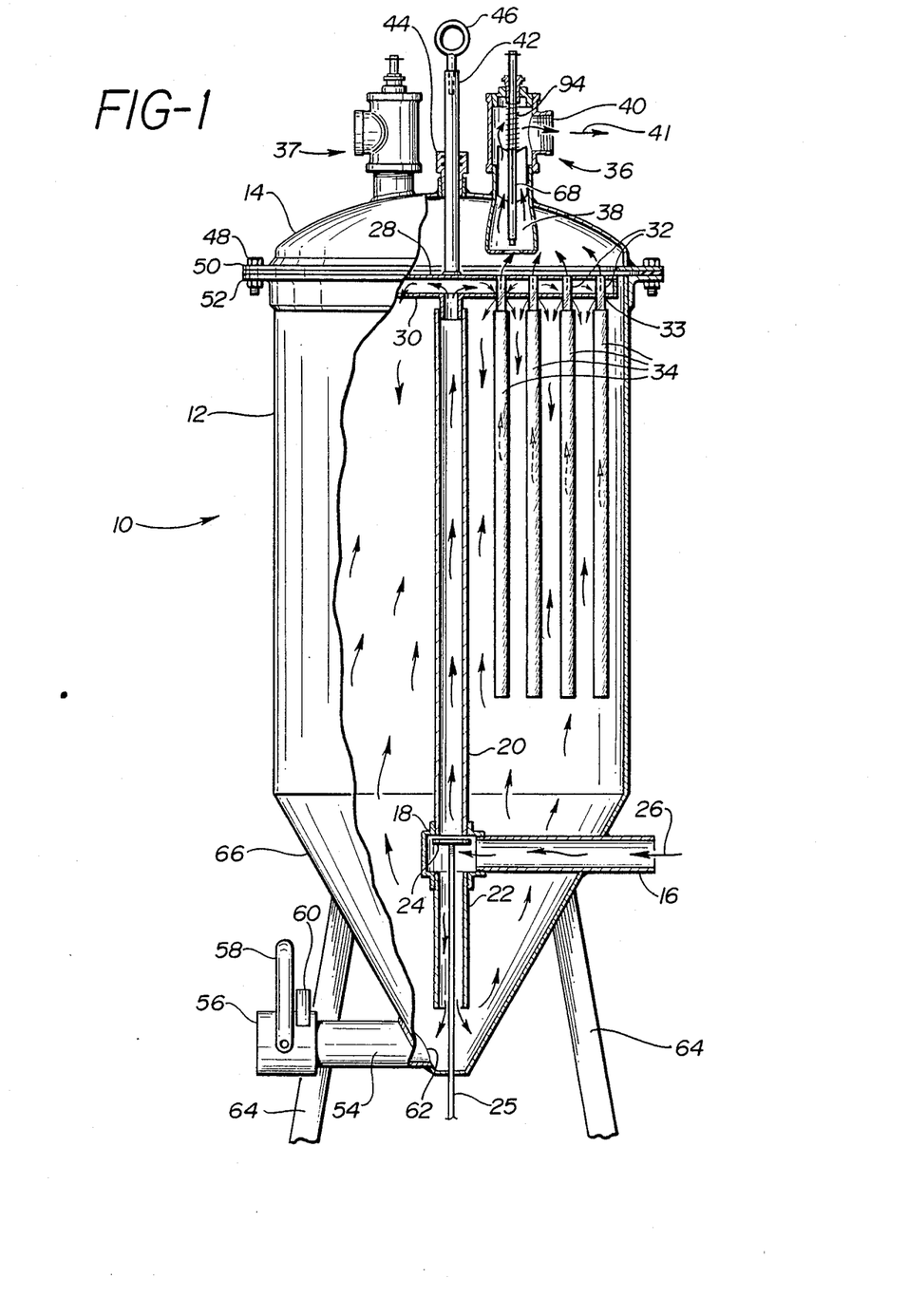
FIG. 1 is an elevational view of the exterior and interior portions of the chamber of the present invention.

Referring now to FIG. 1, there is shown a partial cross-sectional elevational view of the pump housing of the present invention. Shown is filter unit 10 which is generally comprised of chamber 12 and lid 14. The chamber 12 is preferably of corrosion resistant steel, although other suitable materials may be utilized. Disposed at the lower end of the chamber 12 is a fluid inlet conduit 16 which enters the side of the chamber 12 and terminates at a split inlet to form a "T" 18. The split inlet "T" diverges into an upper inlet conduit 20 and a lower inlet conduit 22. Valve disk 24 is disposable between upper inlet conduit 20 and lower inlet conduit 22 at the desired suitable height as will be discussed more fully below. Contaminated or dirty fluid or solvent 26 enters fluid inlet conduit 16 and upon entering inlet "T" 18 is diverted upwardly through upper inlet conduit 20 or downwardly through lower inlet conduit 22 as determined by the position of valve disk 24. The position of valve disk 24 is controlled by control shaft 25 which exits through the bottom of conical section 66 of chamber 12. Control shaft 25 may be a threaded rod so as to vary the height of valve disk 24 or may be part of a slide mechanism (not shown) as desired.

Upper inlet conduit 20 terminates at the bottom of lower tube sheet 30. Accordingly, contaminated fluid 26 moving through upper inlet conduit 20 is forced into the space between upper tube sheet 28 and lower tube sheet 30. Upper filter tube 32 is connected to upper tube sheet 28 as shown and extends through lower tube sheet 30. Upper filter tube 32 is loosely fitted through the associated aperture in lower tube sheet 30. Lower filter tube 34 is secured to upper filter tube 32. Therefore, contaminated fluid passing through inlet conduit 20 is forced between upper and lower tube sheets 28,30 respectively and is forced to escape through space 33 (FIG. 2) between upper filter tube 32 and lower tube sheet 30. This therefore causes the contaminated fluid 26 to enter the chamber 12 in a downward direction.

Figure 2:
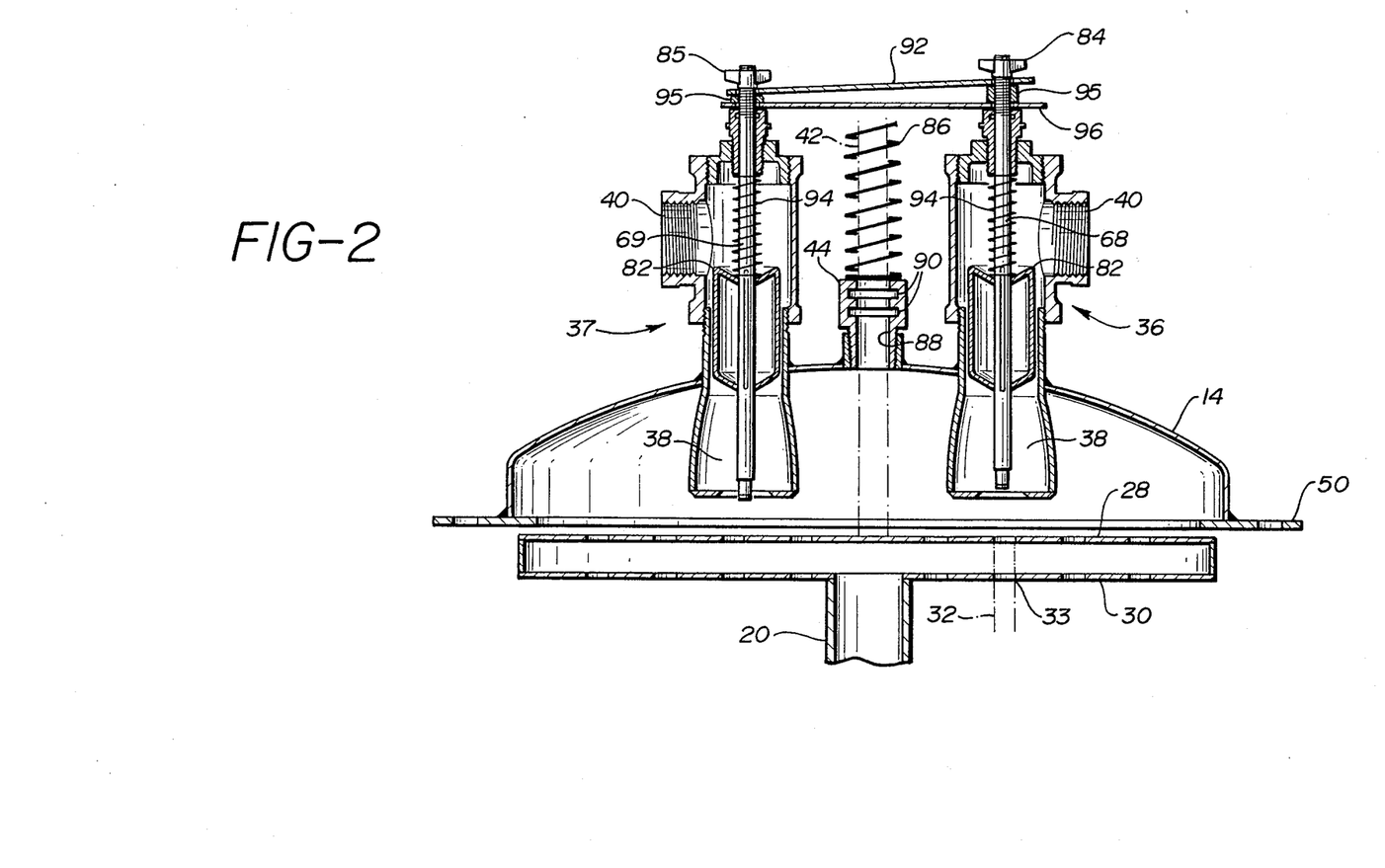
FIG. 2 is a diagrammatic cross-sectional view taken through the upper portion of the chamber of the present invention.

In the preferred embodiment of the present invention, upper filter tube 32 is a mesh having shrink wrap thereon. Lower filter tube 34 is attached to upper filter tube 32 just at the termination of the shrink wrap. Therefore, unfiltered fluid 26 must pass through upper and loer tube sheets 28,30 and enters the main part of chamber 12 via space 33 at the intersection of upper filter tube 32 and lower tube sheet 30. Accordingly, unfiltered fluid 26 is caused to flow downward in chamber 12. Filtered fluid 41 would pass through lower filter tube 34, up through the center of upper filter tube 32 and hence upper tube sheet 28 and finally exit through first outlet conduit 36. It has been found that this downward movement of unfiltered fluid 26 has a number of significant advantages. One such advantage is that bridging between adjacent filter tube of diatomaceous earth is eliminated. Further, a washing effect is accomplished which aids in preventing stratification of the filter media on the tubes. Additionally, undesirable turbulence which may cause interstitial squirming and/or damage to the tubes is no longer present. It is to be understood that upper filter tube 32 may be of any suitable material or configuration such as, for example, stainless steel which would provide support to lower filter tube 34 and would prevent the accumulation of filter media thereon as well as prevent the passage of unfiltered fluid from its exterior to its interior.

Contaminated fluid 26 is also, as mentioned, forced through lower inlet conduit 20 which terminates adjacent the bottom of conical section 66 of chamber 12. Thereafter contaminated fluid 26 is forced upward towards filter tubes 32,34.

Accordingly, contaminated fluid 26 is caused to enter the filter tube 34 from an upward and a downward direction. This therefore minimizes turbulence at the tubes themselves. The fluid then passes through the center of filter tubes 32,34 into lid 14 and thereafter first outlet conduit 36 or second outlet conduit 37. Clean or filtered fluid 41 is accordingly forced to enter fluid outlet intake 38 and thereafter exit conduit 40. First outlet valve disk 68 in conjunction with outlet valve spring 94 is used to enable or prohibit the passage of clean or filtered fluid 41 therethrough as described more fully below.

Slide rod 42 is movably disposed through collar 44 contained at the top of lid 14 and at the upper end is attached to ring 46 and at the lower end is attached to upper tube sheet 28. Accordingly, vertical movement of slide rod 42 will cause upper tube sheet 28 and therefore necessarily filter tubes 32,34 to move simultaneously therewith and will also cause movement of lower tube sheet 30 which is attached to upper tube sheet 28 (as shown more clearly in FIG. 6). Lid 14 has an upper flange 50 while chamber 12 has a lower flange 52 which is matable with upper flange 50. Bolts 48 are utilized to clamp together upper and lower flanges 50,52 respectively in order to form a liquid-tight filter unit 10.

Disposed at the lower end of conical section 66 is fluid outlet conduit 54 having at one end outlet valve 56. Outlet valve 56 is controlled by lever 58 with microswitch 60 being adjacent thereto in order to determine the condition, i.e. opened or closed, of outlet valve 56.

Fluid outlet conduit 54 is relative to aperture 62 in conical section 66. Legs 64 are used to support the filter unit 10.

In the preferred embodiment of the present invention, lower filter tube 32 is in fact medium-support device wherein filtering medium such as diatomaceous earth, normally in suspension in the solvent or fluid to be filtered, is deposited (or redeposited) on the exterior of lower filter tube 32, thus performing a filtering function. Accordingly, this type of filter, generally but inaccurately known as a precoat filter, is reusable a number of times simply by stopping the flow of fluid therethrough and allowing the diatomaceous earth to fall to the bottom of the chamber. Once the diatomaceous earth is completely saturated with contaminants, outlet valve 56 is opened thereby allowing the earth to be removed. New earth may be entered through the top of chamber 12, by removal of lid 14 but is normally introduced through fluid inlet conduit 16 during system startup.

Referring now to FIG. 2, there is shown a cross-sectional view taken through the upper or lid portion of the present invention showing greater detail of the structure therein. Clearly illustrated is how first and second outlet conduits 36,37 respectively are oriented so as to operate in alternating or opposite conditions. That is, for example, when outlet conduit 36 is opened so as to allow clean fluid 41 to exit chamber 12 and therefore pass therethrough, second outlet conduit 37 is closed. Each conduit 36,37 is in turn comprised of fluid outlet intake 38 and an exit conduit 40. First and second outlet valve disks 68,69 respectively control the position of stops or gates 82,83 thereby allowing or prohibiting the passage of fluid therethrough. Outlet valve spring 94 is disposed around valve disks 68,69 and is used for spring biasing stops 82,83 respectively. Disposed between disks 68,69 is pivoting bar 92 which is utilized for keeping one outlet conduit open and one outlet conduit closed (as shown more clearly in FIG. 4). Pivoting bar 92 is retained valve disks 68,69 by wing nuts 84,85. Also disposed between valve disks 68,69 is stationary bar 96 which is retained in its position by nut 95 disposed around each valve disk 68,69 (as shown more clearly in FIGS. 4 and 6). Also shown is compression spring 86 which is disposed around slide rod 42 so as to pull vertically away from lid 14. Collar 44, in which slide rod 42 moves therethrough, is comprised of bore 88 and having a plurality of seats 90 therein. Seats 90 allow for appropriate gasketing thereby prohibiting the exiting of clean filtered fluid therethrough.

Apparent when viewing FIG. 2 is that the normally closed outlet conduit may, due to spring biasing by outlet valve spring 94, act as a pressure-relief valve should a blockage occur in the open outlet conduit. Additionally, it is possible to utilize both outlet conduits simultaneously or to eliminate an outlet conduit or similarly add a third or subsequent outlet conduits as desired.

Figure 4:
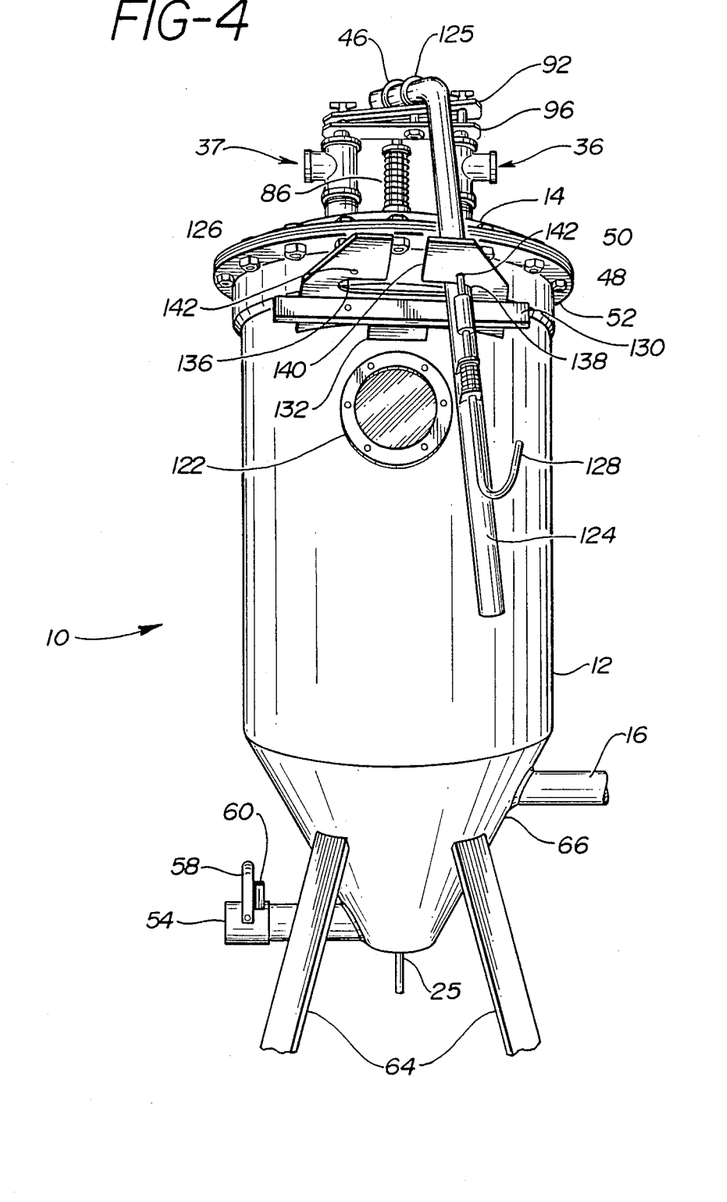
FIG. 4 is a perspective elevational view of the present invention.
Figure 5:
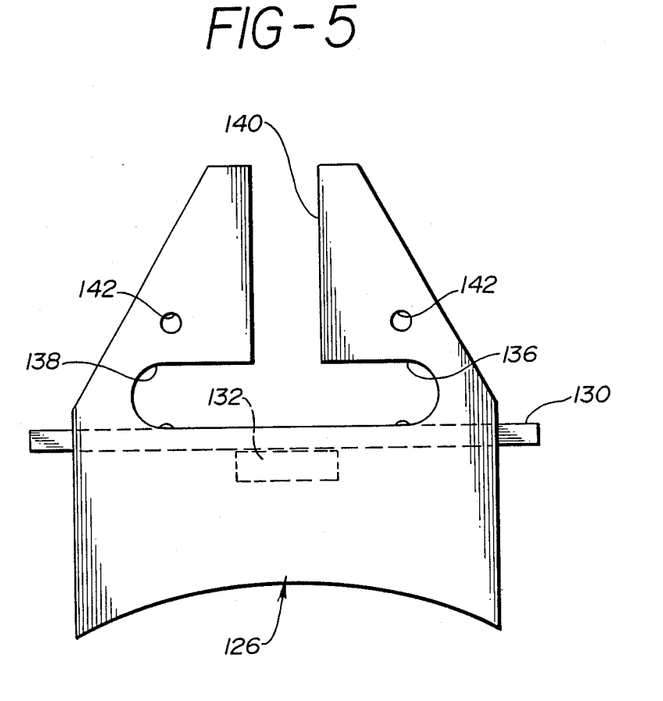
FIG. 5 is a top view of the horizontal control plate of the present invention.
Figure 6:
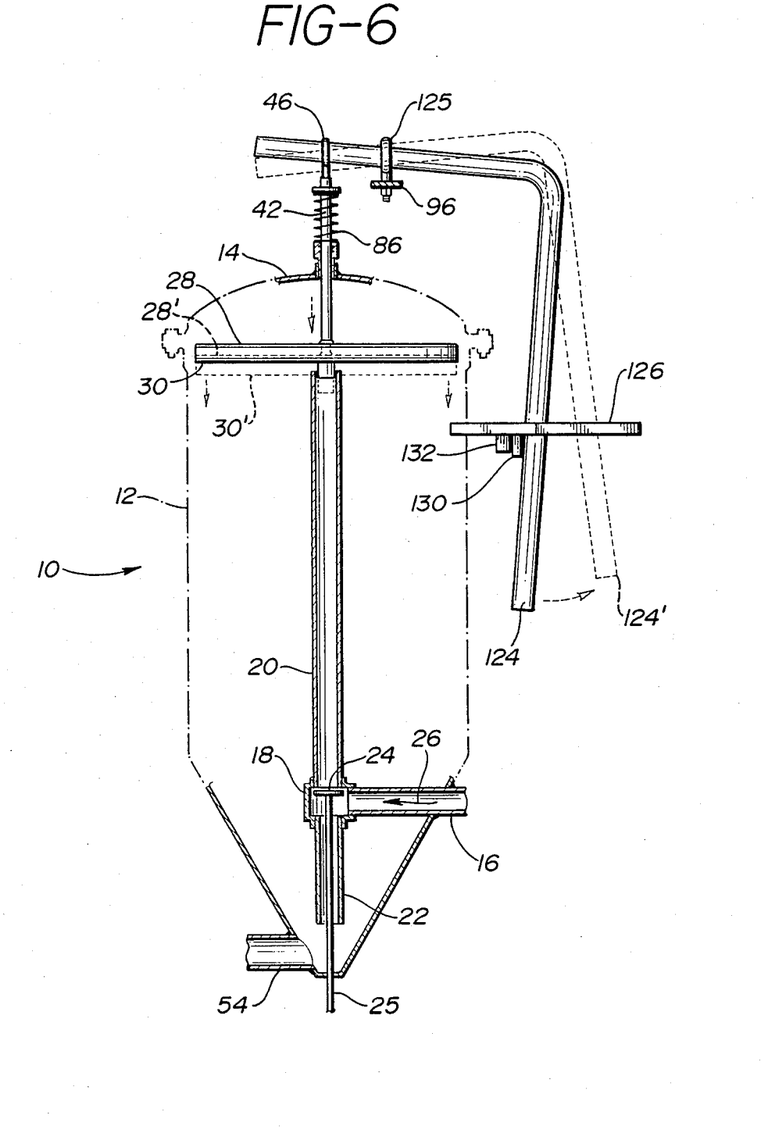
FIG. 6 is a diagrammatic cross-sectional view of the chamber of the present invention.

Referring now to FIGS. 4 and 6, there is illustrated an elevational side view of the present invention. Shown is the filter unit 10 comprised of chamber 12 and lid 14 disposed thereon. Disposed on the exterior of chamber 12 is sight glass 122, which enables the operator to view the interior of filter unit 10. Bump handle 124 is connected between ring 46 of slide rod 42 and is attached by clamp 125 to stationary arm 96. Bump handle 124 is bent so as to be disposed in handle guide 126 (shown more clearly in FIG. 5). Handle guide 126 is formed of plate steel and has a left and right slot 136,138 respectively and a channel 140 disposed between slots 136 and 138. Bump handle 124 has attached to it retainer handle 128 which engages with a bore 42 disposed at either end of left and right slots 136,138. In this manner, bump handle 124 is "locked" into left or right slots 136, 138. Bump handle 124 is positioned so as to ride against pivoting bore 92. Therefore, when bump handle 124 is disposed in right slot 138, first outlet conduit 36 is in the open position and second outlet conduit 37 is in the closed position. Similarly, when bump handle 124 is disposed in left slot 136, second outlet conduit 37 is open while first outlet conduit 36 is closed. In this manner the alternating or reciprocating fashion of outlet conduits of 36,37 is accomplished. Disposed under handle guard 126 is bar 130 with bar 130 having disposed directly adjacent thereto bump handle microswitch 132. Microswitch 132 is disposed adjacent bar 130 such that the electrical contacts contained in microswitch 132 are in one orientation (preferably closed) when bump handle 124 is disposed fully in left or right slot 136,138 and in a second orientation (preferably open) when bump handle 124 is intermediate left and right slots 136,138 such as, for example, in channel 140. Microswitch 132 is interconnected with microswitch 60 such that operation of the filter unit, i.e. pump actuation (not shown) is discontinued when bump handle 124 is intermediate right or left slots 136,138 or outlet valve 56 is not fully closed. Channel 140 allows bump handle 124 to move therethrough such that slide rod 42 is allowed to move vertically up or down and thereby effect bumping of filter tubes 32,34 as described below and as seen in FIG. 6.

Operation

Reference may be now had to FIGS. 1, 2, 3, 4 and particularly 6 in order to clearly understand operation of the present invention. It should be remembered that prior to startup of the present device, the diatomaceous earth will have settled or have been deposited at the bottom of chamber 12. Therefore, a startup procedure must be utilized before actual filtering can be accomplished. It is advantageous that the diatomaceous earth be deposited onto filter tube 34 as expeditiously as possible and that a pressure differential be maintained between the interior of filter tube 34 and the exterior thereof. The pressure, of course, being greater than the interior pressure due to the flow of fluid therethrough. During startup, it is imperative that bump handle 124 be firmly maintained in either right or left slots 136,138 with its position being positively sensed by bump handle microswitch 132. Similarly, since microswitch 60 is, preferably, in series circuit relationship with microswitch 132, it is imperative that outlet valve handle 56 be closed. This therefore ensures that the first or second outlet conduit 36,37 are in the appropriate opened and closed positions respectively. Additionally, valve disk 24 is, preferably, moved by control shaft 25 so as to be in the uppermost position as shown in FIGS. 1 and 6. This therefore effectively prohibits or substantially diminishes the amount of fluid which may pass through upper inlet conduit 20. Therefore, all incoming contaminated fluid 26 must enter fluid inlet conduit 16 and, effectively, pass through lower inlet conduit 22. This forces all contaminated fluid 26 to force all the diatomaceous earth upward into suspension in the chamber 20 and enabling it to therefore be deposited onto filter tubes 30,32 as rapidly as possible.

During this initial startup, a substantial amount of contaminated fluid 26 will pass through the entire filter 10 and exit first outlet conduit 36. Since the diatomaceous earth has not been fully deposited onto filter tubes 32,34, it is evident that the fluid is initially unfiltered or still contaminated. Therefore, a bypass route (not shown) must be utilized to take the contaminated fluid exiting outlet conduit 36 and to feed it back into inlet conduit 16 (not shown). This procedure is continued until the diatomaceous earth has been completely deposited onto the filter tube 34 such that the effluent has cleared up. Thereafter, the bypass may be eliminated (through suitable valving, conduits and the like - not shown). Once the bypass has been removed, the filter unit may then be placed effectively onstream until the accumulation of the contaminants causes an increase in pressure and subsequent diminution of flow in the clean filtered fluid 41.

Further, once initial precoating has been accomplished, control shaft 25 and hence valve disk 24 are moved downwards such that incoming contaminated or dirty fluid 26 is diverted upwardly into upper inlet conduit and downwardly into lower inlet conduit 22. This therefore prohibits excessive disturbace of diatomaceous earth in the bottom of chamber 12. This therefore has the desired effect of stabilizing filter tubes 32,34 and preventing excessive pressure due to turbulence upon them and to further prevent slipping of the diatomaceous earth from the filter tubes should any eddies in the turbulence or any other condition result in an area of lessened pressure or wearing away of the diatomaceous earth from the filter tubes 32,34. This movement of control shaft 25 may be either manual or automatic such as, for example, by pneumatic or mechanical means by interlocking operation of bump handle 124 therewith.

It has been found that for some large scale applications it may be desirable to provide a bifurcated flow in chamber 12. This is accomplished by moving valve disk 24 via control shaft 25 to an intermediate position between its uppermost and lowermost positions. Therefore, unfiltered fluid 26 will flow first downward through lower inlet conduit 22 before being directed upwards towards lower filter tube 34 and will similarly flow upward through upper inlet conduit 20 before being directed downwards towards lower filter tube 34. This will cause the fluid to flow towards lower filter tube 34 from two opposite directions which will have the tendency to cancel out any possible undesirable turbulence effect on filter tube 34 by creating a substantially constant, equal and perpendicular pressure on filter tube 34. Accordingly, maximum uniform deposition of diatomaceous earth will accumulate on the filter tubes while stratification and bridging will be prevented.

Once it has been determined that throughput has decreased or that the effluent is not as clean as desired, it becomes necessary to clean filter tubes 32,34. Accordingly, the pump may either be turned off or the bump handle 124 is merely moved intermediate left and right slots 136,138 such as in the vicinity of channel 140. Bump handle 124 is then lifted through channel 140 into the position shown by dashed lines 124'. This thereby causes upper and lower tube sheets 28,30 to move vertically downward in chamber 12 to the position shown by dashed lines 28',30' along with associated filter tubes 32,34. Bump handle 124 is then moved back so that upper tube sheets 28,30 and therefore filter tubes 32,34 are moved back up such that the four components 28-34 are bumped against an upper surface in chamber 12 thereby causing contaminants and diatomaceous earth to fall to the bottom of chamber 12. During bumping, upon downward movement of the slide rod 42, liquid is displaced to the area above tube sheets 30,32 with the result that upon vertical upward movement of slide rod 42, the liquid is forced backward through tube sheets 30,32 thereby accomplishing a violent and extremely effective, what may be described as hydraulic backwash operation. It is to be understood, however, that in this operation the fluid does not move but rather the tube sheets and associated filter tubes 28 2 move relative to the liquid thereby simulating rapid movement of the liquid so as to cause a pressure differential across each of the tube sheets 28,30. It has been found that backwashing creates a significant force which may in fact damage the bump handle 124 should the operator attempt to bump the filter without first shutting off the pump. For example, a 24 inch filter running at 20 pounds would see a force of 9,000 pounds. Hence, it has been found that it is most important that microswitch 132 be used to sense when the filter is in the "bump" mode. This operation is repeated until the bumping causes as much filter media as possible to fall to the bottom of the chamber 12, all of which may be viewed through sight tube 122. It is to be understood that although bumping may be accomplished manually as described, it is possible for automated bumping to be accomplished by use of pneumatic cylinders, actuators and the like. Further, the mechanical stops used during the pumping process as well as sudden stopping of the tube sheets will result in static bumping, which in conjunction with the mentioned hydraulic bumping has been found to be effective in removing filter media from the filter tubes.

Thereafter, the startup procedure previously mentioned would be initiated in order to precoat filter tube 34 just before startup and hence filtration. In the event that this bumping procedure does not adequately reduce pressure and improve flow, it is necessary to remove the diatomaceous earth via fluid outlet conduit 54 and that new diatomaceous earth be introduced, preferably in the bypass conduits during the startup procedure. It has been found that it is generally advantageous to have one outlet conduit such as 36 expressly used for the purpose of exiting clean or filtered fluid 41 while the remaining outlet conduit, preferably second outlet conduit 37, be used in bypass operation during filter startup. Therefore, after bumping and during initial startup, bump handle 124 would be disposed in left slot 136. As soon as appropriate precoating of the diatomaceous earth on filter tube 34 has been accomplished, bump handle 124 is moved over to right slot 138. In this manner, it is possible to eliminate rapid valve changes and the like since bump handle 124 accomplishes the initiation or cessation of the bypass operation.

Additionally, it has been found that if it is desired to more rapidly precoat filter tubes 32,34, a second pump may be introduced on line for the purpose of bringing a greater flow or volume of fluid through fluid inlet conduit 16. This is preferably accomplished by use of an additional microswitch adjacent left slot 136. Therefore, during the bypass operation described when bump handle 124 is in left slot 136, the microswitch adjacent thereto would cause the second pump to be energized. The second pump would be deenergized, thereby returning all fluid to normal flow conditions when bump handle 124 is removed from the bypass position into the "run" condition by its movement in right slot 138.

Figure 3:
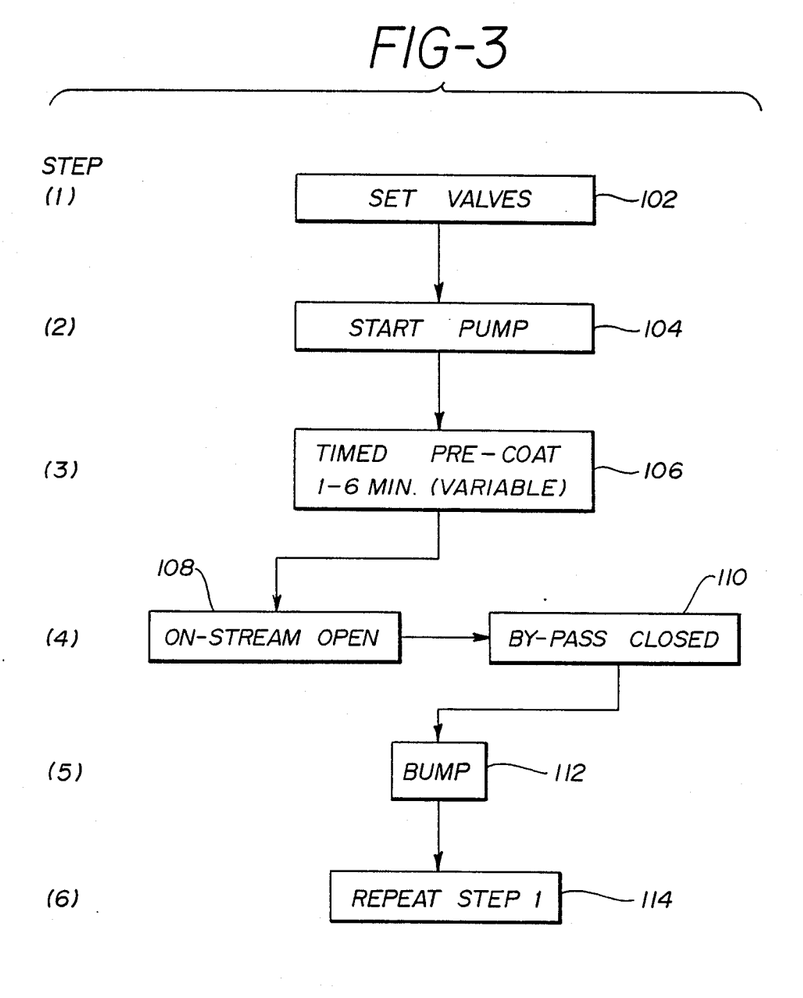
FIG. 3 is a block diagram illustrating in flow chart format, operation of the present device.

Accordingly, operation of the present device is relatively simple and foolproof and may be completed by following the steps substantially shown in FIG. 3. Accordingly, in block 102 of step 1, "set valves" indicates that first or second outlet conduits 36,37 are respectively closed and opened. Next, in step 2 at block 104, the pump would be started by use of bump handle microswitch 132 being energized when bump handle 124 is placed into left slot 136. This would then start the precoat cycle and may be either manually or automatically timed as desired. It has been found that, for example in the filtering of dry cleaning fluids, a suitable time of one to six minutes in order to accomplish precoating is reasonable. Once it has been determined that suitable precoating has been accomplished, online operation is accomplished as indicated in step 4 blocks 108,110 by moving bump handle 124 from left slot 136 to right slot 138 thereby closing second outlet conduit 37 (block 110) and opening first outlet conduit 36 (block 108). The system is then left onstream to run and filter the fluid as desired. Thereafter, when it is determined that the fluid is no longer being properly filtered or there is a diminished flow of clean fluid, it becomes evident that it is necessary to bump the filter. It has also been found that typical onstream operation is one-and-a-half to three hours before bumping is required. This may be timed automatically or manually initiated by the operator. Accordingly, as indicated in step 5 block 112, bump handle 124 is moved into the center position intermediate slots 136,138 thereby shutting off the pump since its position is sensed by bump handle microswitch 132 and the filter is then bumped as previously described. Thereafter, as indicated is step 6 block 114, the entire cycle is again repeated. In the event that flow is not improved or the contaminated filter is not adequately cleaned, then it comes necessary to dump and replace some or all of the diatomaceous earth as previously described.

Further, due to "modular" nature of filters presently utilized and the construction of the present invention, many elements of the present invention may be "retrofitted" to existing systems without the need for substantial modifications and may in fact be done, so as to incorporate some or all of the features of the present invention.

It is to be understood that many variations from the present invention may be practised without departing from the spirit and scope of the present invention. For example, a plurality of tube sheets may be utilized while the fluid inlet conduits may be oriented in a plurality of directions so as to direct, for example, three or more streams of incoming contaminated fluid down towards the bottom of the chamber. Also, a number of devices may be pneumatically or electrically operated such as the dump valve or the outlet conduits while different types of switches such as magnetic switches or proximity sensors may be utilized.

Having thus described the present invention in detail, it is to be understood that the foregoing description is not intended to limit the spirit and scope thereof. What is desired to be protected by Letters Patent is set forth in the appended claims.

What is claimed is:

1. A fluid filter, comprising:
    a casing;
    a tube sheet dividing said casing into a filtered and an unfiltered chamber, said tube sheet having openings therethrough;
    a filter unit in each of said openings in said tube sheet;
    a filtered fluid outlet in said filtered chamber;
    fluid inlet means in said unfiltered chamber for directing the flow of fluid, toward said filtered chamber, and away from said filtered chamber and, wherein said fluid inlet means is comprised of a valve means for directing the flow of fluid towards said filtered and said unfiltered chamber.

2. A fluid filter according to claim 1, wherein said fluid inlet means is comprised of a split outlet coupling having a fluid inlet and a first fluid outlet for directing the fluid towards said filtered chamber and a second fluid outlet for directing the fluid away from said filtered chamber, and wherein said split outlet coupling has disposed therein said valve means for directing the flow of fluid through said split outlet coupling.

3. A fluid filter according to claim 2, wherein said valve means for directing the flow of fluid is comprised of a valve disk disposed therein and a control shaft connected to said valve disk and extending through said casing, the position of said valve disk being controllable from without said casing, said valve disk controlling said direction of said flow.

4. A fluid filter according to claim 1, wherein said valve means for directing the flow of fluid is comprised of a valve disk disposed therein and a control shaft connected to said valve disk and extending through said casing, the position of said valve disk being controllable from without said casing, said valve disk controlling said direction of said flow.

5. A fluid filter according to claim 1, further comprising a conduit means connected to said fluid inlet means for directing the flow of fluid so as to be adjacent said tube sheet.

6. A fluid filter according to claim 1, wherein said filter unit is comprised of a filter media means for supporting diatomaceous earth thereon.

7. A fluid filter, comprising:
    a casing;
    a first tube sheet dividing said casing into a filtered chamber and an unfiltered chamber, said first tube sheet having openings therethrough;
    a second tube sheet adjacent to said first tube sheet and disposed in said unfiltered chamber, said second tube sheet fixed to said first tube sheet wherein said second tube sheet has openings therethrough, said openings of the second tube sheet being coextensive with said openings in said first tube sheet, said first tube sheet and said second tube sheet being movable within said casing;
    a filter unit in each said opening in said first tube sheet, and extending through said openings in said second tube sheet;
    a filtered fluid outlet in said filtered chamber; and
    fluid inlet means in said unfiltered chamber.

8. A fluid filter according to claim 7, wherein said fluid inlet means is comprised of a split coupling having a fluid inlet and a first fluid outlet for directing said fluid between said first and second tube sheets, and a second fluid outlet for directing fluid away from said filtered chamber.

9. A fluid filter according to claim 8, wherein said coupling has disposed therein a valve means for directing the flow of fluid through said first fluid outlet.

10. A fluid filter according to claim 9, wherein said valve means for directing the flow of fluid is comprised of a valve disk disposed therein and a control shaft connected to said valve disk and extending through said casing, the position of said valve disk being controllable from without said casing, said valve disk controlling said direction of said flow.

11. A fluid filter according to claim 7, wherein said fluid inlet means is comprised of a valve means for directing the flow of fluid towards said filtered and said unfiltered chamber.

12. A fluid filter according to claim 11, wherein said valve means for directing the flow of fluid is comprised of a valve disk disposed therein and a control shaft connected to said valve disk and extending through said casing, the position of said valve disk being controllable from without said casing, said valve disk controlling said direction of said flow.

13. A fluid filter according to claim 7, wherein said filter unit is comprised of at least one upper filter tube connected to an opening in said first tube sheet and extending through a corresponding opening in said second tube sheet, and one lower filter tube connected to that portion of said upper filter tube extending through said second tube sheet.

14. A fluid filter according to claim 13, wherein said upper filter tube is non-porous.

15. A fluid filter according to claim 7, wherein said fluid inlet means has connected to it a conduit means for directing the flow of fluid between said first tube sheet and said second tube sheet.

16. A fluid filter according to claim 7, wherein said first tube sheet is connected to a slide rod, said slide rod extending through said filtered chamber and wherein said slide rod may be moved in an axial direction thereby causing said first tube sheet to move in said casing.

17. A fluid filter according to claim 7, wherein said filter unit is comprised of a filter media means for supporting diatomaceous earth thereon.

18. A fluid filter, comprising:
a casing;
a first tube sheet dividing said casing into a filtered chamber and an unfiltered chamber, said first tube sheet having openings therethrough;
a second tube sheet disposed in said unfiltered chamber and connected to said first tube sheet, said second tube sheet having openings therethrough, said openings in said second tube sheet being coextensive with said openings in said first tube sheet;
a filter unit in each opening in said first tube sheet, and extending through said openings in said second tube sheet, said filter unit comprised of at least one non-porous upper filter tube connected to an opening in said first tube sheet and extending through a corresponding opening in said second tube sheet, and one lower filter tube connected to that portion of said upper filter tube extending through said second tube sheet;
a filtered fluid outlet in said filtered chamber;
fluid inlet means in said unfiltered chamber for directing the flow of fluid, said fluid inlet means comprised of a split outlet fluid inlet means coupling having a fluid inlet and a first fluid outlet for directing the fluid between said first tube sheet and said second tube sheet, and a second fluid outlet for directing the fluid away from said filtered chamber; and
valve means disposed in said fluid inlet means for directing the flow of fluid through said split outlet coupling.

* * * * *